US009930517B2

United States Patent
Chen

(10) Patent No.: US 9,930,517 B2
(45) Date of Patent: Mar. 27, 2018

(54) APPARATUSES AND METHODS FOR HANDLING CHANGE OF USER EQUIPMENT (UE) USAGE TYPE

(71) Applicant: Acer Incorporated, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/203,475

(22) Filed: Jul. 6, 2016

(65) Prior Publication Data

US 2017/0127263 A1  May 4, 2017

Related U.S. Application Data

(60) Provisional application No. 62/248,424, filed on Oct. 30, 2015.

(51) Int. Cl.
*H04W 8/04* (2009.01)
*H04L 12/24* (2006.01)
(Continued)

(52) U.S. Cl.
CPC ........... *H04W 8/04* (2013.01); *H04L 41/0803* (2013.01); *H04W 8/20* (2013.01); *H04W 24/08* (2013.01); *H04W 84/04* (2013.01)

(58) Field of Classification Search
CPC ....... H04W 48/18; H04W 8/20; H04W 24/02; H04W 28/08; H04W 28/12; H04W 36/12; H04W 4/005; H04W 72/0406; H04W 76/02; H04W 76/027; H04W 84/04; H04W 8/04; H04W 8/06; H04M 3/42
See application file for complete search history.

(56) References Cited

U.S. PATENT DOCUMENTS

2011/0287765 A1* 11/2011 Russell ................ H04W 60/04
455/435.1
2013/0100795 A1*  4/2013 Zhao ................. H04W 36/0016
370/216

(Continued)

FOREIGN PATENT DOCUMENTS

EP          2385714 A2    11/2011

OTHER PUBLICATIONS

EP Search Report dated Mar. 20, 2017 in European Application (No. 16188902.7-1857).

(Continued)

*Primary Examiner* — George Eng
*Assistant Examiner* — Umair Ahsan
(74) *Attorney, Agent, or Firm* — McClure, Qualey & Rodack, LLP

(57) ABSTRACT

A mobile communication device configured for CIoT is provided. The mobile communication device includes a wireless transceiver and a controller. The wireless transceiver performs wireless transmission and reception to and from a service network. The controller transmits, via the wireless transceiver, a request message to the service network for changing a UE usage type, receives a response message comprising a wait timer value from the service network via the wireless transceiver, and does not transmit another request message to the service network for changing the UE usage type before the wait timer expires.

12 Claims, 6 Drawing Sheets

(51) Int. Cl.
*H04W 24/08* (2009.01)
*H04W 8/20* (2009.01)
*H04W 84/04* (2009.01)

(56) References Cited

U.S. PATENT DOCUMENTS

| | | | | |
|---|---|---|---|---|
| 2013/0201823 A1* | 8/2013 | Gupta | ............... | H04W 28/12 370/230 |
| 2014/0211728 A1* | 7/2014 | Zembutsu | ............ | H04M 3/42 370/329 |
| 2017/0127263 A1* | 5/2017 | Chen | ............... | H04L 41/0803 |

OTHER PUBLICATIONS

"3rd Generation Partnership Project; Technical Specification Group Services and System Aspects; Architecture enhancements for Cellular Internet of Things (Release 13)"; 3GPP TR 23.720 V1.1.0(Oct. 2015); Technical Report; pp. 1-90.

"Selection of CIoT DCN"; SA WG2 Meeting #110-AH Sophia Antipolis, France, Aug. 31-Sep. 3, 2015; pp. 1-4

* cited by examiner

APPARATUSES AND METHODS FOR HANDLING CHANGE OF USER EQUIPMENT (UE) USAGE TYPE

CROSS REFERENCE TO RELATED APPLICATIONS

This Application claims priority of U.S. Provisional Application No. 62/248,424, filed on Oct. 30, 2015, the entirety of which is incorporated by reference herein.

BACKGROUND OF THE APPLICATION

Field of the Application

The application generally relates to wireless communications for Cellular Internet of Things (CIoT), and more particularly, to mobile communication devices, Mobility Management Entities (MMEs), and methods for handling changes of CIoT UE usage type.

Description of the Related Art

Cellular Internet of Things (CIoT) is an emerging technology, linking different communication devices, including sensors and actuators, such as Radio Frequency Identifications (RFID), Global Positioning Systems (GPS), and laser scanners, through various wireless technologies, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

Typically, the CIoT technology is used for various purposes related to information collection and analysis, such as monitoring the behavior of persons, things, and/or data through space and time, achieving real-time awareness of the physical environment, assisting human decision making through deep analysis and data visualization, gathering information in diverse settings including natural ecosystems, buildings, and factories and sending the information to one or more server stations. The collected and analyzed information may be used for automation and control, such as automated control of closed systems, control of consumption to optimize resource use across networks, and automated control in an open environment with uncertainty. The emergence of the CIoT technology is promoted by a wide range of applications, including security and surveillance, medical, environmental and weather monitoring, monitoring and control of industrial processes, such as agriculture, smart spaces, and smart cities, among others.

In general, a CIoT User Equipment (UE) may send its usage type to the service network when it is not yet registered with the service network in its current area. Based on the UE usage type and operator policy, the service network may decide which Dedicated Core Network (DCN) the CIoT UE should be redirected to. The basic idea is to separate the data traffic of CIoT UEs from the data traffic of normal UEs, and allow the data traffic to be handled by different core networks. FIG. 1 is a schematic diagram illustrating an exemplary core network selection based on the LTE technology.

However, in the conventional design in compliance with the 3rd Generation Partnership Project (3GPP) specification TR 23.720, a UE (e.g., a CIoT UE or a normal UE) can only send its usage type to the service network when it is not registered in the current area. That is, once the UE has completed registration, it cannot request a change of its usage type to the service network again in the same area. Thus, it is desirable to have a solution for a UE to initiate a change of its usage type even when it has already completed registration in the current area.

BRIEF SUMMARY OF THE APPLICATION

In a first aspect of the application, a mobile communication device configured for CIoT is provided. The mobile communication device comprises a wireless transceiver and a controller. The wireless transceiver is configured to perform wireless transmission and reception to and from a service network. The controller is configured to transmit, via the wireless transceiver, a request message to the service network for changing a UE usage type, receive a response message comprising a wait timer value from the service network via the wireless transceiver, and not transmit another request message to the service network for changing the UE usage type before the wait timer expires.

In a second aspect of the application, a method for a mobile communication device configured for CIoT to change a UE usage type is provided. The method comprises the steps of: transmitting a request message to a service network for changing a UE usage type; receiving a response message comprising a wait timer value from the service network; and not transmitting another request message to the service network for changing the UE usage type before the wait timer expires.

In a third aspect of the application, a mobile communication device configured for CIoT is provided. The mobile communication device comprises a wireless transceiver and a controller. The wireless transceiver is configured to perform wireless transmission and reception to and from a service network. The controller is configured to transmit, via the wireless transceiver, a tracking area update request or attach request message comprising a requested change of a UE usage type to the service network, and receive a tracking area update response or attach response message comprising a change result of the UE usage type from the service network via the wireless transceiver.

In a fourth aspect of the application, a method for a mobile communication device configured for CIoT to change a UE usage type is provided. The method comprises the steps of: transmitting a tracking area update request or attach request message comprising a requested change of a UE usage type to a service network; and receiving a tracking area update response or attach response message comprising a change result of the UE usage type from the service network.

In a fifth aspect of the application, a Mobility Management Entity (MME), coupled to a cellular station serving a mobile communication device configured for CIoT is provided. The MME comprises a controller and a non-transitory computer readable storage medium. The non-transitory computer readable storage medium stores instructions which, when executed by the controller, cause the controller to perform steps comprising: receiving a request message comprising a requested change of a UE usage type from the mobile communication device via the cellular station, and transmitting a response message comprising a wait timer value to the mobile communication device via the cellular station, so as to refrain the mobile communication device from transmitting another request message for changing the UE usage type before the wait timer expires.

In a sixth aspect of the application, a method for an MME to handle a request from a mobile communication device configured for CIoT for changing a UE usage type is provided. The method comprises the steps of: receiving a request message comprising a requested change of a UE usage type from the mobile communication device; and transmitting a response message comprising a wait timer value to the mobile communication device, so as to refrain the mobile communication device from transmitting another request message for changing the UE usage type before the wait timer expires.

In a seventh aspect of the application, an MME coupled to a Home Subscriber Server (HSS) is provided. The MME comprises a controller and a non-transitory computer readable storage medium. The non-transitory computer readable storage medium stores instructions which, when executed by the controller, cause the controller to perform steps comprising: receiving a request message comprising a requested change of a UE usage type from a mobile communication device configured for CIoT, determining whether to accept the requested change according to a locally stored UE usage type of the mobile communication device, which is obtained in a previous inquiry to the HSS when the mobile communication device was attached to or registered with the MME for the first time, and transmitting an acceptance message to the mobile communication device when accepting the requested change or transmitting a rejection message to the mobile communication device when rejecting the requested change.

In an eighth aspect of the application, a method for an MME to handle a request from a mobile communication device configured for CIoT for changing a UE usage type. The method comprises the steps of: receiving a request message comprising a requested change of a UE usage type from the mobile communication device; determining whether to accept the requested change according to a locally stored UE usage type of the mobile communication device, which is obtained in a previous inquiry to the HSS when the mobile communication device was attached to or registered with the MME for the first time; and transmitting an acceptance message to the mobile communication device when accepting the requested change or transmitting a rejection message to the mobile communication device when rejecting the requested change.

Other aspects and features of the invention will become apparent to those with ordinary skill in the art upon review of the following descriptions of specific embodiments of the mobile communication devices, MMEs, and methods for handling change of UE usage type.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
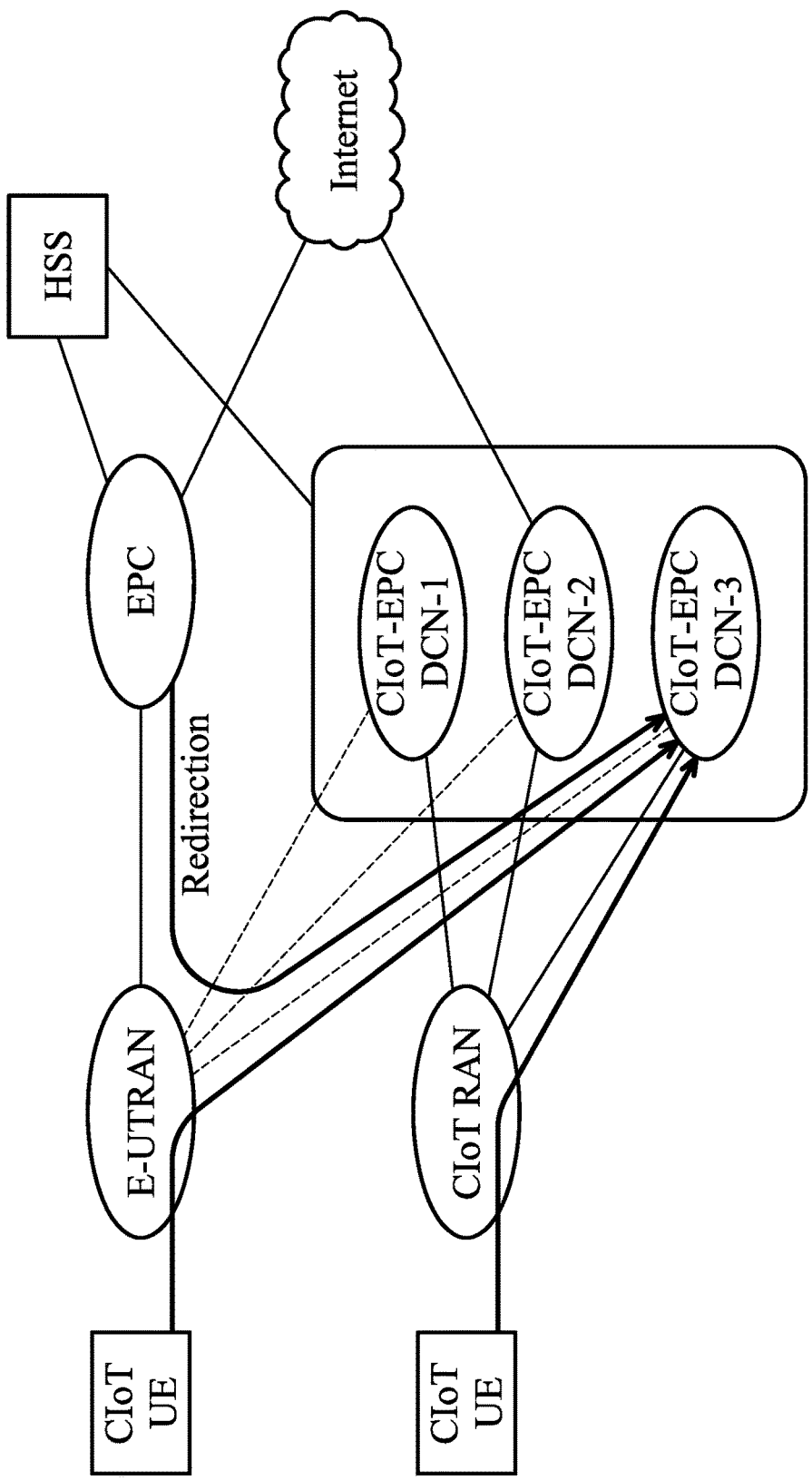
FIG. 1 is a schematic diagram illustrating an exemplary core network selection based on the LTE technology.
Figure 2:
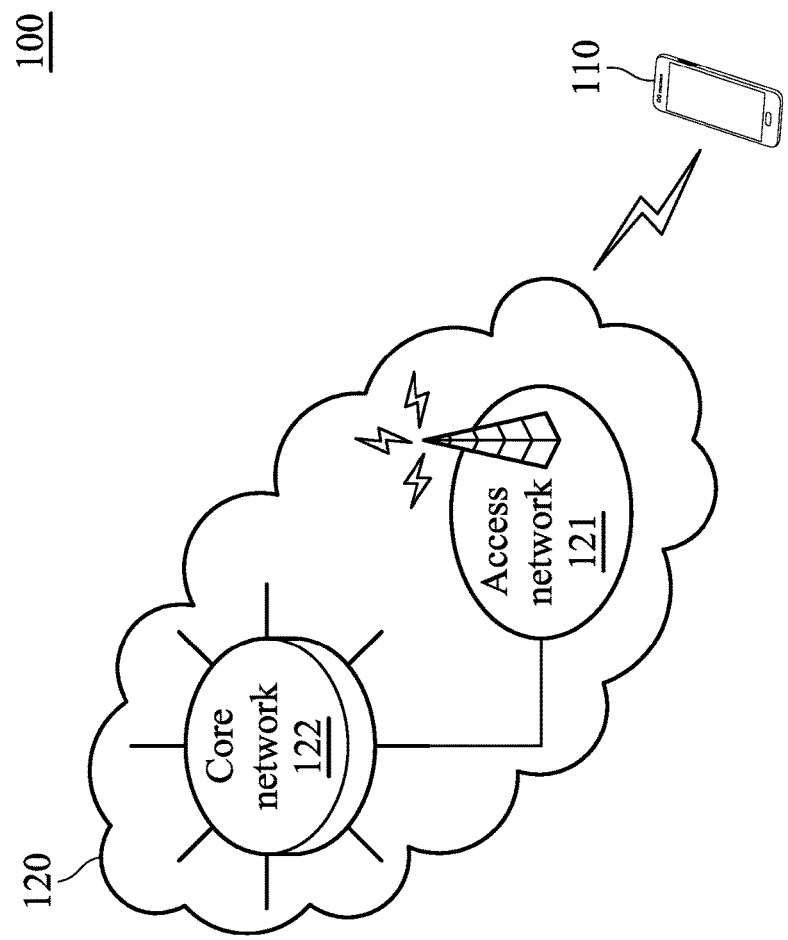
FIG. 2 is a block diagram of a wireless communication environment according to an embodiment of the application.

FIG. 2 is a block diagram of a wireless communication environment according to an embodiment of the application. The wireless communication environment comprises a mobile communication device 110 and a service network 120, wherein the mobile communication device 110 is wirelessly connected to the service network 120 for obtaining mobile services. The mobile communication device 110 may be configured as a CIoT UE or normal UE, depending on its usage type. The mobile communication device 110 may be a feature phone, a smartphone, a panel Personal Computer (PC), a laptop computer, a wearable device/biosensor, or any computing device supporting the wireless technology utilized by the service network 120. For example, the mobile communication device 110 may be configured for CIoT and run an application for CIoT. In one embodiment, the mobile communication device 110 may be a CIoT sensor employed to monitor the operation status of a certain facility, such as a water treatment facility or bridge, or monitor biological information, such as blood pressure, body temperature, and/or heart rate of the wearer, and report measurement results back to control centers.

The service network 120 may an LTE network, an LTE-A network, or a TD-LTE network. Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, the access network 121 may be an Evolved-Universal Terrestrial Radio Access (E-UTRAN) which includes at least a cellular station, e.g., an evolved NB (eNB), and the core network 142 may be an Evolved Packet Core (EPC) which includes a Home Subscriber Server (HSS), Mobility Management Entity (MME), Serving Gateway (S-GW), and Packet Data Network Gateway (PDN-GW or P-GW), etc.

In the use case of CIoT, the access network 121 may also include a CIoT Radio Access Network (RAN), and the core network 122 may also include one or more CIoT-EPC DCNs for processing the tasks related to CIoT.

The HSS is a central database that contains user-related and subscription-related information, such as UE's default usage type. The functions of the HSS include mobility management, call and session establishment support, user authentication and access authorization.

The MME (for Mobility Management Entity) deals with the control plane. It handles the signaling related to mobility and security for E-UTRAN access. The MME is responsible for the tracking and the paging of UE in idle mode. It is the termination point of the Non-Access Stratum (NAS).

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle mode UEs, the SGW terminates the downlink data path and triggers paging when downlink data arrives for the UE. It manages and stores UE contexts, e.g. parameters of the Internet Protocol (IP) bearer service, network internal routing information. It also performs replication of the user traffic in case of lawful interception.

The P-GW provides connectivity from the UE to external Packet Data Networks (PDNs) by being the point of exit and entry of traffic for the UE. A UE may have simultaneous connectivity with more than one P-GW for accessing multiple PDNs. The P-GW is also responsible for performing policy enforcement, packet filtering for each user, charging support, lawful interception, and packet screening.

Figure 3:
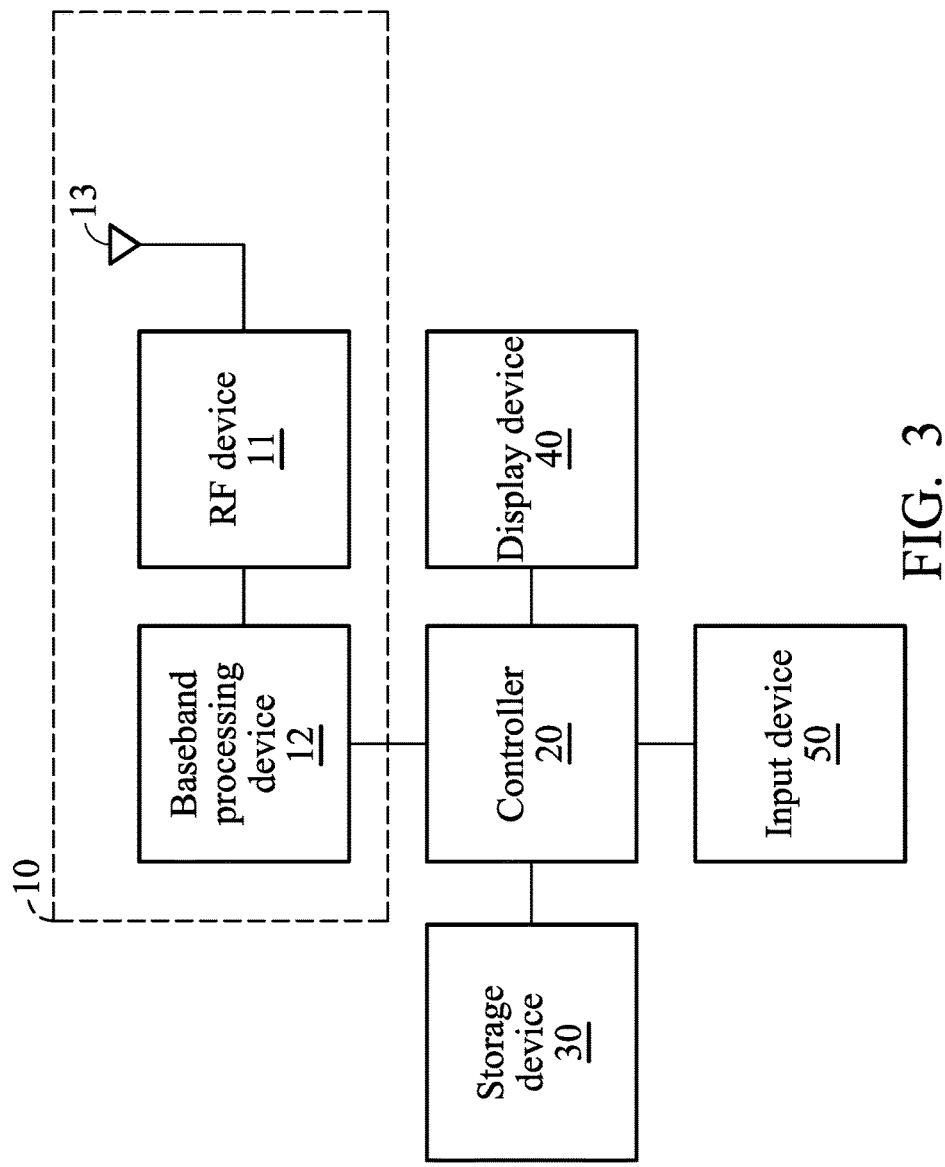
FIG. 3 is a block diagram illustrating the mobile communication device 110 according to an embodiment of the application.

FIG. 3 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 2100 MHz, or 2.6 GHz utilized in the LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for wireless communications with the service network 120, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 to perform the method of the present application.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 3 are for illustrative purposes only and are not intended to limit the scope of the application. For example, the mobile communication device 110 may further comprise a power supply, and/or a sensor for sensing the water level of a water facility, or sensing leaks in a gas pipe, or sensing biological information, such as blood pressure, body temperature, and/or heart rate, of the wearer.

Figure 4:
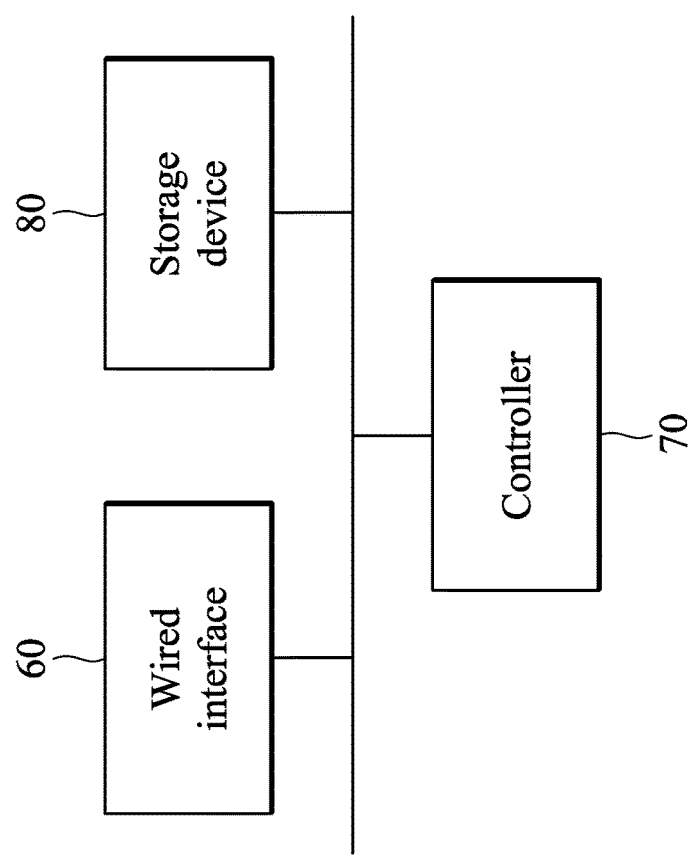
FIG. 4 is a block diagram illustrating an MME according to an embodiment of the application.

FIG. 4 is a block diagram illustrating an MME according to an embodiment of the application. The MME includes a wired interface 60, a controller 70, and a storage device 80.

The wired interface 60 is responsible for providing wired communications with other network entities, such as cellular stations, HSS, S-GW(s), and P-GW(s), of the service network 120. The wired interface 60 may include a cable modem, an Asymmetric Digital Subscriber Line (ADSL) modem, a Fiber-Optic Modem (FOM), an Ethernet network interface, or another wired interface.

The controller 70 may be a general-purpose processor, an MCU, an application processor, a DSP, or the like, which includes various circuitry for providing the function of data processing and computing, controlling the operation of the wired interface 60, and loading and executing a series of instructions and/or program codes from the storage device 80, to provide MME functionality and perform the method of the present application.

The storage device 80 is a non-transitory computer readable storage medium, such as a memory (e.g., RAM, Flash memory, or NVRAM, etc.), a magnetic storage device (e.g., magnetic tape or hard disk), an optical storage device (e.g., CD-ROM), or any combination thereof for storing UE's usage type obtained from the HSS, instructions and/or program codes of applications, communication protocols, and/or the method of the present application.

Although not shown, the network device may further include other functional units, such as an I/O device (e.g., display device, button, keyboard, mouse, touch pad, or touch screen, etc.), and a power supply, and the application is not limited thereto.

As will be appreciated by persons skilled in the art, the circuitry of the controller 20 and 70 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

Figure 5:
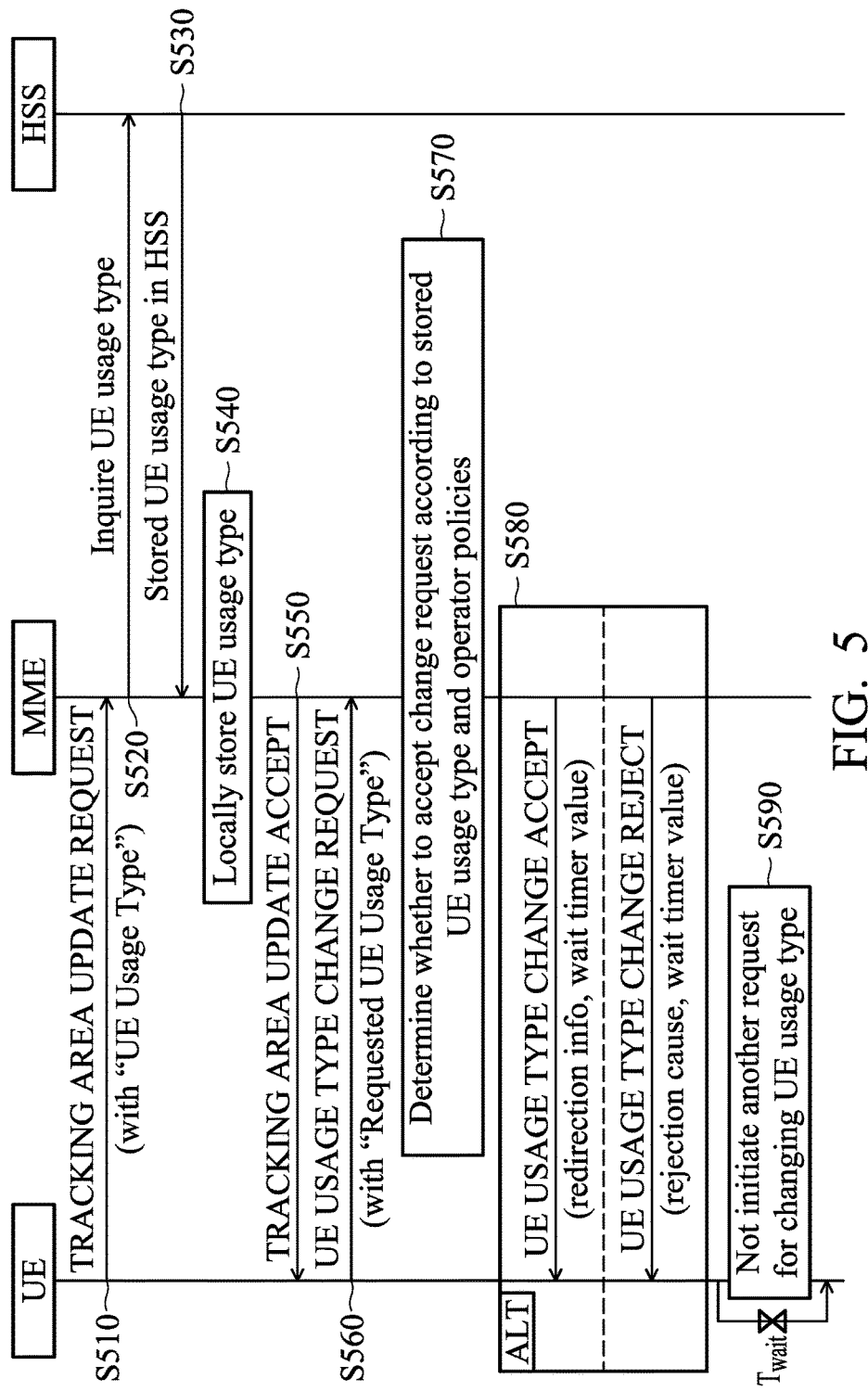
FIG. 5 is a message sequence chart illustrating the change of UE usage type according to an embodiment of the application.

FIG. 5 is a message sequence chart illustrating the change of UE usage type according to an embodiment of the application. To begin, the UE performs a tracking area update procedure to register with the service network for the first time in the current area, by transmitting a TRACKING AREA UPDATE REQUEST message comprising the "UE Usage Type" Information Element (IE) (step S510). When receiving the TRACKING AREA UPDATE REQUEST message, the MME inquires the HSS about the UE's usage type (step S520). In response to the inquiry, the HSS replies to the MME with the UE's usage type stored therein (step S530). The MME stores the UE's usage type locally for subsequent uses (step S540).

In this embodiment, it is assumed that the UE usage type obtained from the HSS is the same as the UE usage type provided by the UE. Next, the MME transmits a TRACKING AREA UPDATE ACCEPT message to the UE (step S550).

Subsequently, the UE initiate a NAS procedure for changing the UE usage type, by transmitting a UE USAGE TYPE CHANGE REQUEST message comprising a "Requested UE usage type" IE to the MME (step S560). Specifically, the NAS procedure is a newly defined procedure dedicated for changing the UE usage type. In one embodiment, if the UE is not yet connected to the service network, the UE may first perform a Radio Resource Control (RRC) connection establishment procedure with the service network before the NAS procedure. Please note that, in the present application, the UE may initiate the NAS procedure for changing the UE usage type whenever it needs to do so, even when it has already registered with the service network in the current area.

When receiving the UE USAGE TYPE CHANGE REQUEST message, the MME may determine whether to accept the change request according to the stored UE's usage type and operator policies (step 570), and replies to the UE with a response message (step S580).

If the MME accepts the change request, it may perform a redirection procedure to redirect the UE to be served by appropriate DCN and transmit a UE USAGE TYPE CHANGE ACCEPT message comprising redirection information and a wait timer value to the UE. For detailed description of the redirection information, reference may be made to the 3GPP TR 23.707. Otherwise, if the MME rejects the change request, it may transmit a UE USAGE TYPE CHANGE REJECT message comprising a rejection cause and a wait timer value to the UE. The rejection cause may indicate the cause of rejection, e.g., "HSS not allow" or "Network policy not allow". The wait timer value specifies the period of time in which the UE should wait before initiating another request for changing the UE usage type. Advantageously, by assigning the wait timer value to the UE, the MME may be able to prevent the UE from initiating requests for changing UE usage type too frequently.

When receiving the response message, the UE starts the wait timer and does not initiate another request for changing the UE usage type before the wait timer expires (step S590).

Figure 6:
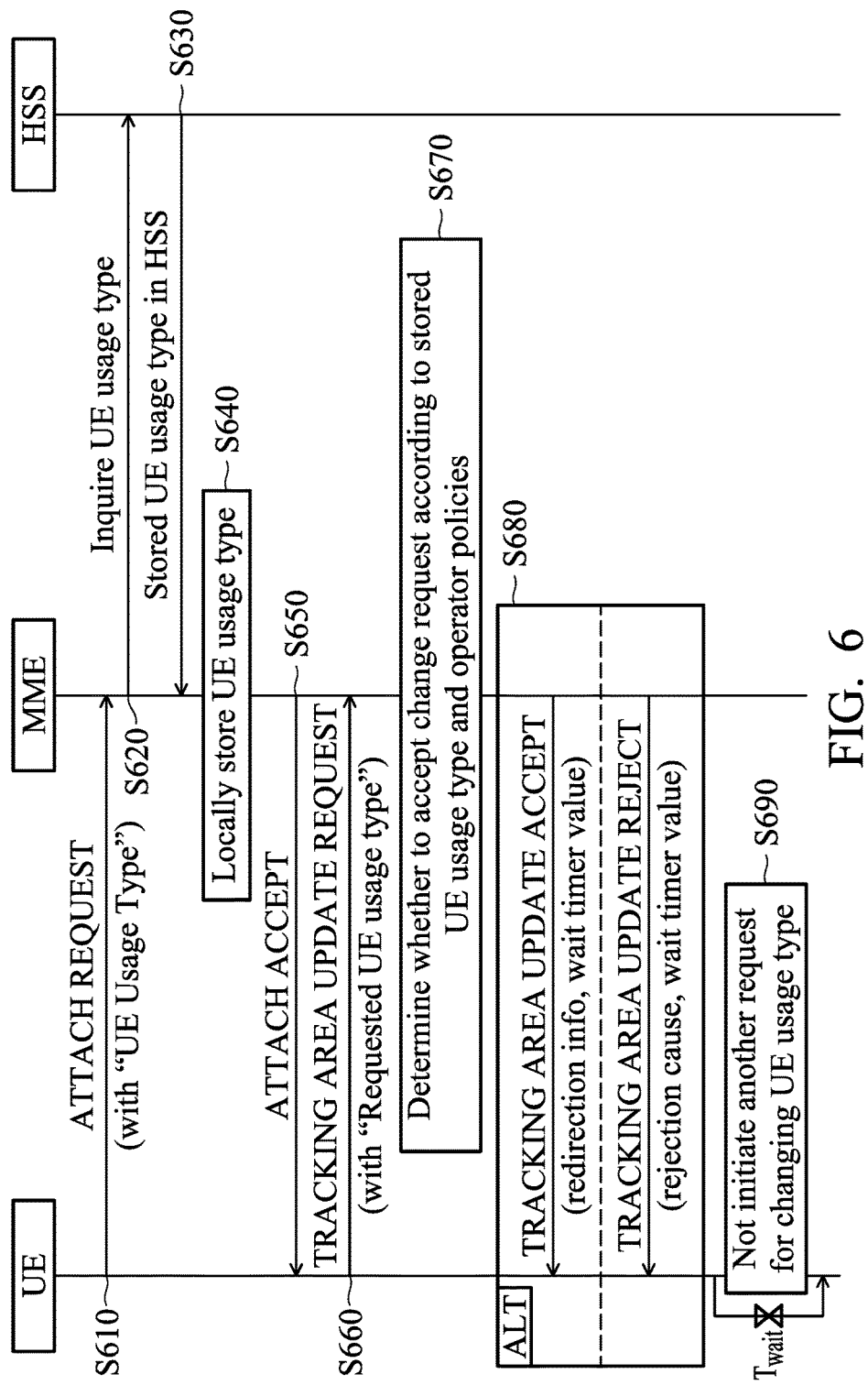
FIG. 6 is a message sequence chart illustrating the change of UE usage type according to another embodiment of the application.

FIG. 6 is a message sequence chart illustrating the change of UE usage type according to another embodiment of the application. To begin, the UE performs an attach procedure to register with the service network for the first time in the current area, by transmitting an ATTACH REQUEST message comprising the "UE Usage Type" IE (step S610). When receiving the ATTACH REQUEST message, the MME inquires the HSS about the UE's usage type (step S620). In response to the inquiry, the HSS replies to the MME with the UE's usage type stored therein (step S630). The MME stores the UE's usage type locally for subsequent uses (step S640).

In this embodiment, it is assumed that the UE usage type obtained from the HSS is the same as the UE usage type provided by the UE. Next, the MME transmits an ATTACH ACCEPT message to the UE (step S650).

Subsequently, the UE initiate a tracking area update procedure for changing the UE usage type, by transmitting a TRACKING AREA UPDATE REQUEST message comprising a "Requested UE usage type" IE to the MME (step S660). Specifically, the tracking area update procedure is similar to the tracking area update procedure defined in compliance with the 3GPP TS 24.301, except that the tracking area update procedure in this embodiment may also be used for changing the UE usage type.

In one embodiment, if the UE needs to register with the service network in the new area, it may include other IEs related to tracking area update in the TRACKING AREA UPDATE REQUEST message. In another embodiment, if the UE is already registered with the service network in the current area, it may include only the "Requested UE usage type" IE in the TRACKING AREA UPDATE REQUEST message.

Please note that, in the present application, the UE may initiate the tracking area update procedure for changing the UE usage type whenever it needs to do so, even when it has already registered with the service network in the current area.

When receiving the TRACKING AREA UPDATE REQUEST message, the MME may determine whether to accept the change request according to the stored UE's usage type and operator policies (step 670), and replies to the UE with a response message (step S680). In one embodiment, if the TRACKING AREA UPDATE REQUEST message includes other IEs related to tracking area update, the MME may also perform the tracking area update procedure with other network nodes of the service network according to the other IEs.

If the MME accepts the change request, it may perform a redirection procedure to redirect the UE to be served by appropriate DCN and transmit a TRACKING AREA UPDATE ACCEPT message comprising redirection information and a wait timer value to the UE. For detailed description of the redirection information, reference may be made to the 3GPP TR 23.707. Otherwise, if the MME rejects the change request, it may transmit a TRACKING AREA UPDATE REJECT message comprising a rejection cause and a wait timer value to the UE. The rejection cause may indicate the cause of rejection, e.g., "HSS not allow" or "Network policy not allow". The wait timer value specifies the period of time in which the UE should wait before initiating another request for changing the UE usage type.

When receiving the response message, the UE starts the wait timer and does not initiate another request for changing the UE usage type before the wait timer expires (step S690).

Please note that, unlike a conventional MME, the MME in the embodiments of FIGS. 5 and 6 is capable of locally storing the UE usage type obtained from the HSS. Thus, the MME does not need to inquire the HSS every time it receives a UE's request for changing the UE usage type, thereby reducing the signaling between the MME and HSS.

While the application has been described by way of example and in terms of preferred embodiment, it is to be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, located in an area, comprising:
    a wireless transceiver, configured to perform wireless transmission and reception to and from a service network; and
    a controller, configured to, after the mobile communication device has registered with the service network in the area using a User Equipment (UE) usage type, transmit, via the wireless transceiver, a request message to the service network for changing the UE usage type, receive a response message comprising a wait timer value from the service network via the wireless transceiver, and not transmit another request message to the service network for changing the UE usage type before the wait timer expires.

2. The mobile communication device of claim 1, wherein the response message further comprises redirection information redirecting the mobile communication device to be served by a Dedicated Core Network (DCN) of the service network when the request message for changing the UE usage type is accepted by the service network, or comprises a rejection cause when the request message for changing the UE usage type is rejected by the service network.

3. The mobile communication device of claim 1, wherein the controller further stops the wait timer when the mobile communication device is moved to a new location where it has not previously registered with the service network.

4. A method for a mobile communication device located in an area to change a User Equipment (UE) usage type, the method comprising:
    after registering with a service network in the area using a User Equipment (UE) usage type, transmitting a request message to the service network for changing the UE usage type;
    receiving a response message comprising a wait timer value from the service network; and
    not transmitting another request message to the service network for changing the UE usage type before the wait timer expires.

5. The method of claim 4, wherein the response message further comprises redirection information redirecting the mobile communication device to be served by a Dedicated Core Network (DCN) of the service network when the request message for changing the UE usage type is accepted by the service network, or comprises a rejection cause when the request message for changing the UE usage type is rejected by the service network.

6. The method of claim 4, further comprising:
    stopping the wait timer when the mobile communication device is moved to a new location where it has not previously registered with the service network.

7. A mobile communication device, located in an area, comprising:
    a wireless transceiver, configured to perform wireless transmission and reception to and from a service network; and
    a controller, configured to, after the mobile communication device has registered with the service network in the area using a User Equipment (UE) usage type, transmit, via the wireless transceiver, a tracking area update request or attach request message comprising a requested change of the UE usage type to the service network, and receive a tracking area update response or attach response message comprising a change result of the UE usage type from the service network via the wireless transceiver.

8. The mobile communication device of claim 7, wherein the controller further processes Information Elements (IEs) other than the change result in the tracking area update response or attach response message for completing a tracking area update or attach procedure.

9. The mobile communication device of claim 7, wherein the tracking area update response or attach response message further comprises redirection information redirecting the mobile communication device to be served by a Dedicated Core Network (DCN) of the service network when the change result indicates that the requested change of the UE usage type has been accepted, or comprises a rejection cause when the change result indicates that the requested change of the UE usage type has been rejected.

10. A method for a mobile communication device located in an area to change a User Equipment (UE) usage type, the method comprising:
    after registering with a service network in the area using a User Equipment (UE) usage type, transmitting a tracking area update request or attach request message comprising a requested change of the UE usage type to the service network; and
    receiving a tracking area update response or attach response message comprising a change result of the UE usage type from the service network.

11. The method of claim 10, further comprising:
    processing Information Elements (IEs) other than the change result in the tracking area update response or attach response message for completing a tracking area update or attach procedure.

12. The method of claim 10, wherein the tracking area update response or attach response message further comprises redirection information redirecting the mobile communication device to be served by a Dedicated Core Network (DCN) of the service network when the change result indicates that the requested change of the UE usage type has been accepted, or comprises a rejection cause when the change result indicates that the requested change of the UE usage type has been rejected.

* * * * *